(12) United States Patent
Bai et al.

(10) Patent No.: US 8,435,123 B2
(45) Date of Patent: May 7, 2013

(54) VIBRATION ABSORBER

(75) Inventors: Shushan Bai, Ann Arbor, MI (US); Paul G. Otanez, Troy, MI (US); Vijay A. Neelakantan, Rochester Hills, MI (US); Donald L. Dusenberry, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 128 days.

(21) Appl. No.: 13/006,924

(22) Filed: Jan. 14, 2011

(65) Prior Publication Data
US 2011/0195794 A1 Aug. 11, 2011

Related U.S. Application Data

(60) Provisional application No. 61/302,043, filed on Feb. 5, 2010.

(51) Int. Cl.
*F16F 15/123* (2006.01)
(52) U.S. Cl.
USPC .......................................... 464/68.2

(58) Field of Classification Search ............... 464/66.1, 464/68.1, 68.2; 192/201; 188/378
See application file for complete search history.

(56) References Cited

U.S. PATENT DOCUMENTS

| 6,394,908 B1 * | 5/2002 | Lambert et al. ............. 464/68.2 |
| 8,161,739 B2 * | 4/2012 | Degler et al. |
| 2011/0180358 A1 * | 7/2011 | Otanez et al. |

FOREIGN PATENT DOCUMENTS

DE 102008057648 * 6/2009

* cited by examiner

*Primary Examiner* — Gregory Binda
*Assistant Examiner* — Josh Skroupa

(57) ABSTRACT

A system for absorbing vibration created by operation of an engine of the present invention includes a first plate driven by an engine shaft and a torque transmitting device for transferring torque from the engine shaft to a transmission input shaft. The system includes a first vibration absorber and a second vibration absorber. The first vibration absorber includes at least one selectively moveable mass. The second vibration absorber includes at least one biasing member and generally opposing ends. The first vibration absorber is configured to absorb vibrations created at a first harmonic of the engine and the second vibration absorber is configured to absorb vibrations created at multiple harmonics of the engine.

9 Claims, 7 Drawing Sheets

VIBRATION ABSORBER

CROSS-REFERENCE TO RELATED APPLICATIONS

This application claims the benefit of U.S. Provisional Application No. 61/302,043 filed on Feb. 5, 2010. The disclosure of the above application is incorporated herein by reference.

FIELD

The present disclosure relates to a system for absorbing vibration created by operation of an engine, and in particular to a system including a first vibration absorber configured to absorb vibrations created at a first harmonic of the engine, and a second vibration absorber configured to absorb vibrations created at multiple harmonics of the engine.

BACKGROUND

The statements in this section merely provide background information related to the present disclosure and may or may not constitute prior art.

Centrifugal Pendulum Vibration Absorbers (CPVAs) are typically used to reduce torsional vibrations in rotating machine components. For example, a rotating member such as a shaft includes several CPVAs, where each CPVA has a pendulum mass that oscillates as the shaft rotates. The movement of the pendulum masses counteract torque fluctuations that are transmitted from the engine to the shaft as the shaft rotates, which reduces the torsional vibration of the shaft. CPVAs can be designed such that the oscillation frequency of the pendulum mass matches the engine combustion frequency at any engine operating speed. However, matching the oscillation frequency with the engine combustion frequency does not always provide suitable vibration reduction in automotive vehicles. This is because frequency characteristics of automotive engines in motor vehicles are influenced by axle stiffness and transmission inertias as well as engine RPM.

As a result, spring dampers are sometimes used instead of CPVAs to attenuate torsional vibrations transmitted by automobile engines. However, one drawback is that spring dampers are generally only effective within a predetermined frequency range that is often narrow. The design tradeoff of having to tune the spring dampers for a specific frequency range results in that they are generally not able to provide sufficient dampening at lower engine speeds such as when the engine operates at idle.

While current CPVAs and spring dampers achieve their intended purpose, there is a need for a new and improved vibration dampening system which exhibits improved performance from the standpoint of dampening torsional vibrations at a variety of engine speeds.

SUMMARY

The present invention provides a system for absorbing vibration created by operation of an engine. The system includes a first plate driven by an engine shaft and a torque transmitting device for transferring torque from the engine shaft to a transmission input shaft. The system includes a first vibration absorber and a second vibration absorber. The first vibration absorber includes at least one selectively moveable mass. The second vibration absorber includes at least one biasing member and generally opposing ends. The first vibration absorber is configured to absorb vibrations created at a first harmonic of the engine and the second vibration absorber is configured to absorb vibrations created at multiple harmonics of the engine.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
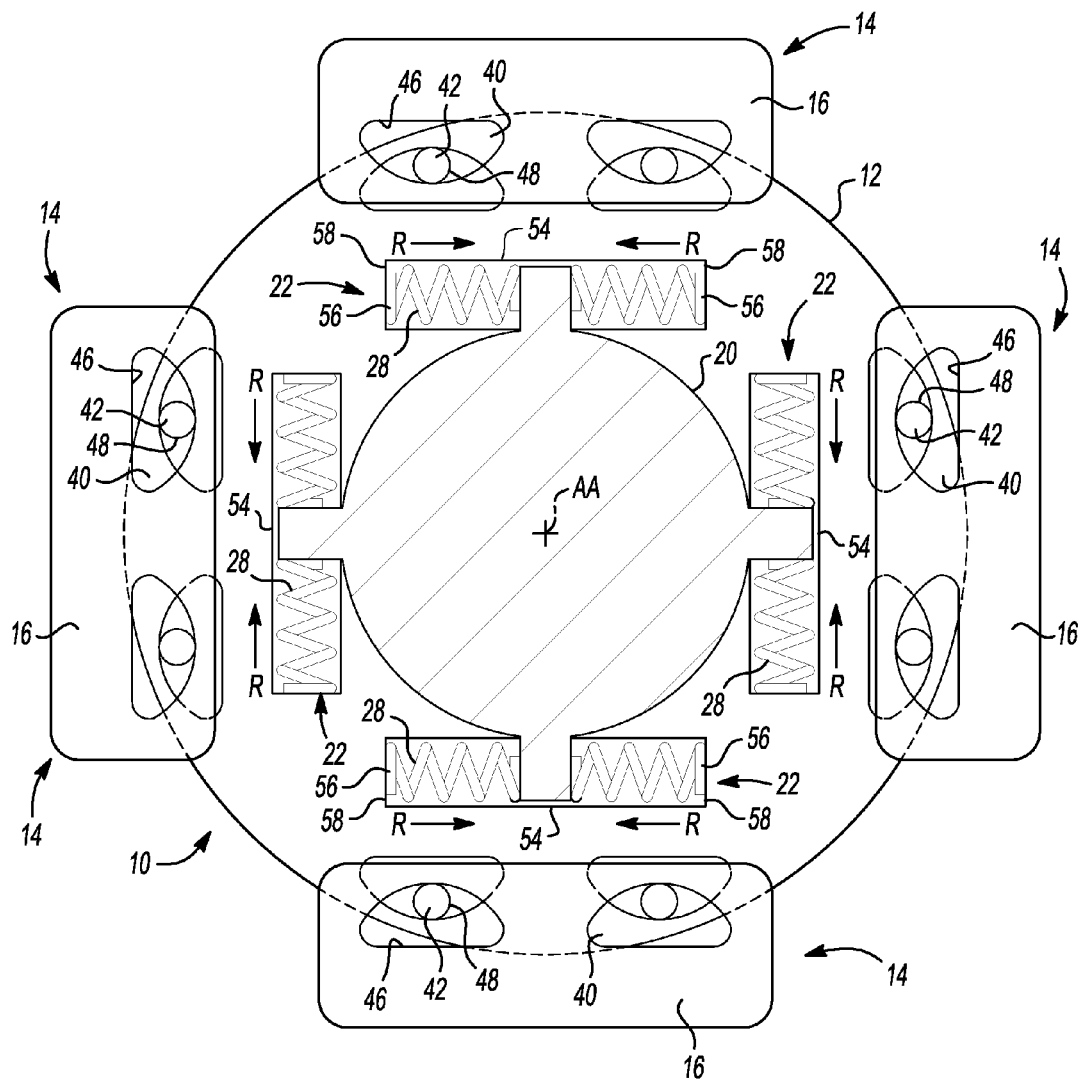
FIG. 1 is a schematic view of an exemplary vibration absorber system including a first set of vibration absorbers and a second set of vibration absorbers.

The following description is merely exemplary in nature and is not intended to limit the present disclosure, application, or uses. With reference to FIG. 1, a vibration absorber system is generally indicated by reference number 10. The vibration absorber system 10 includes a first rotating member or plate 12 and a first set of vibration absorbers 14 that are slidingly connected with the first plate 12. Each of the first vibration absorbers 14 include a selectively moveable pendulum mass 16. FIG. 1 illustrates the first set of vibration absorbers 14 as centrifugal pendulum vibration absorbers (CPVAs), however other variations of vibration absorbers that employ selectively moveable masses may be used as well. The first plate 12 is driven by an engine (not shown), or other torque producing machine to provide a driving torque to the first plate 12. The first plate 12 is any plate that mounts to an output shaft 18 (FIG. 2) of the engine such as, for example, a flywheel. In the present embodiment, the vibration absorber system 10 is employed in an automotive engine.

The vibration absorber system 10 also includes a second rotating plate 20 and a second set of vibration absorbers 22 that are connected to the second plate 20. In the example provided, the second rotating plate 20 is part of a torque transmitting device 24 (FIG. 2) such as, for example, a torque converter of an automatic transmission or a clutch of a manual transmission. However, it should be appreciated that the second rotating plate 20 may be various other components without departing from the scope of the present invention. The second set of vibration absorbers 22 are a plurality of biasing members 28 such as, for example, spring dampers that employ a coil spring. However, one of skill in the art will appreciate that other types of biasing members can be used as well such as, for example, resilient members constructed from an elastomer.

Each of the first set of vibration absorbers 14 are circumferentially arranged in a substantially symmetrical pattern around a rotational axis A-A of the first plate 12. In the present embodiment, four vibration absorbers 14 are included with the vibration absorber system 10, however those skilled in the art will appreciate that any number of vibration absorbers may be used. The present embodiment also illustrates each of the first vibration absorbers 14 corresponding with one of the second vibration absorbers 22 such that there are an equal number of first vibration absorbers 14 and second vibration absorbers 22. However, an unequal number of first vibration absorbers 14 and second vibration absorbers 22 may be used as well.

The masses 16 of the first set of vibration absorbers 14 are each slidingly engaged with the first plate 12, where each mass 16 includes at least one aperture 40 located within the mass 16. A corresponding post or pin 42 connected to the first plate 12 is provided for each aperture 40, where each aperture 40 receives at least one of the posts 42. A portion of an inner surface 46 of each aperture 40 contacts a portion of an outer surface 48 of the post 42. When the first plate 12 is at rest, the masses 16 each remain generally stationary and do not move substantially. However, each mass 16 oscillates or travels about the corresponding post 42 when the first plate 12 rotates about the axis A-A. Specifically, as the mass 16 travels about the corresponding posts 42, a portion of the outer surface 48 of the posts 42 slide about a portion of the inner surface 46 of the apertures 40. Each mass 16 travels about a specific path that is determined by the movement of the mass 16 about the corresponding posts 42. The movement of the masses 16 along the paths counteract at least some of the torque fluctuations that are created as the engine operates, which thereby reduces torsional vibration.

In one embodiment, each of the masses 16 include generally identical paths, where the masses 16 move in unison with one another. The masses 16 travel in synchronicity with one another if the engine produces a torsional vibration that is of a single harmonic order. Alternatively in another embodiment, the first vibration absorbers 14 are configured to absorb torsional vibrations that have at least two different harmonic orders. For example, the engine can produce torsional vibrations of at least two different harmonics due to the firing sequence of the engine's spark plugs. In another example, the engine produces torsional vibrations that have different harmonics if an engine operates on less than all of the cylinders during an improved fuel efficiency mode of operation. For example, if an eight cylinder engine switches to a fuel efficiency mode only a portion of the eight cylinders are actively fired to provide engine power. This improved fuel efficiency mode of operation improves the fuel economy of the engine. The engine produces torsional vibrations of a different harmonic content when operating with eight cylinders when compared to the torsional vibrations created as the engine operates on six cylinders.

If the engine produces torsional vibrations of at least two different harmonic orders, at least one of the masses 16 travel at a different frequency about the path when compared to the remaining masses 16. That is, each of the masses 16 do not travel in synchronicity with one another. Instead, one of the masses 16 travels at a first engine firing frequency about the path to attenuate torsional vibrations created at a first frequency, and the remaining masses 16 travel at a second or other harmonic of the engine firing frequency about the path to attenuate torsional vibrations created at the particular harmonic.

Figure 2A:
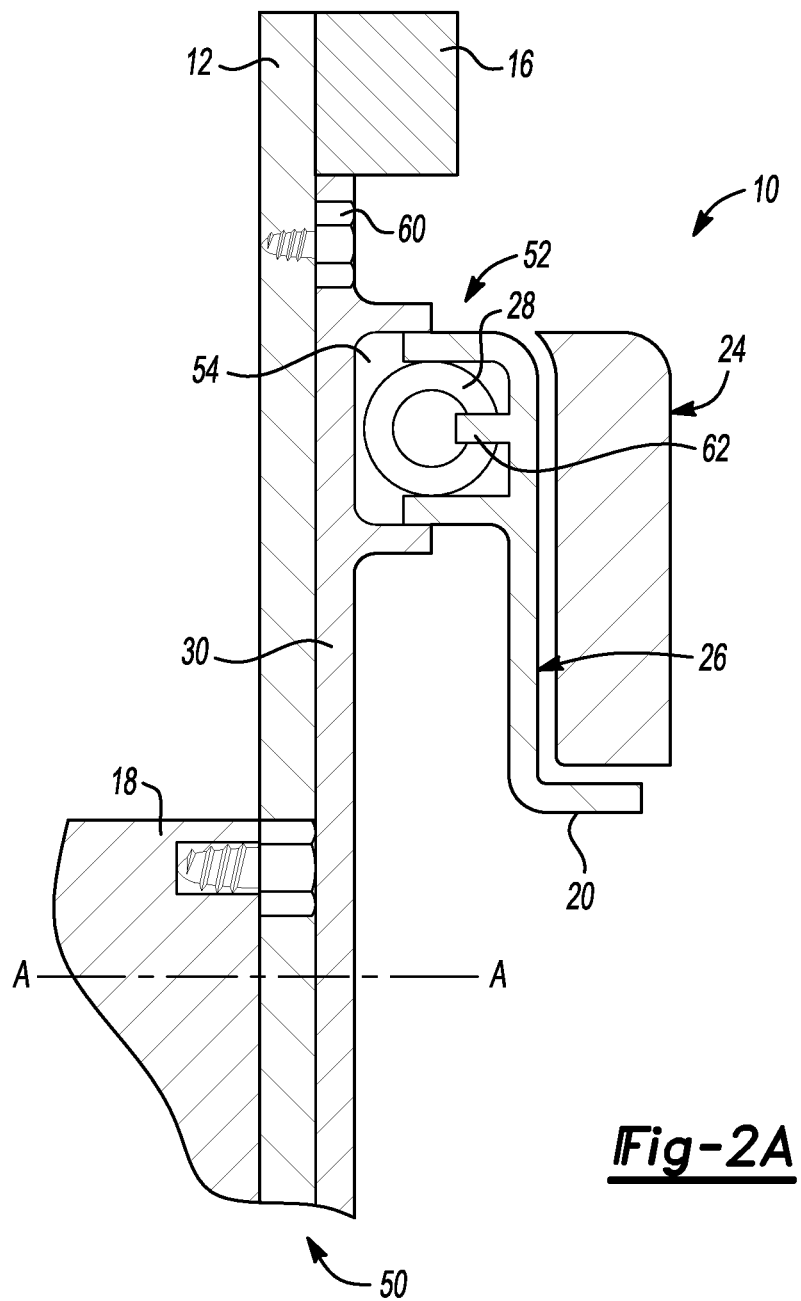
FIG. 2A is a cross sectioned view of the vibration absorber system illustrated in FIG. 1.

Referring to FIGS. 1 and 2A, the biasing members 28 are secured in place within a torsion vibration damper assembly 26 and are circumferentially spaced about the axis A-A. In the embodiment as illustrated in FIG. 1, the biasing members 28 are oriented linearly about the axis A-A. However, the biasing members 28 can also be oriented arcuately about the axis A-A instead. The biasing members 28 are compressible to absorb torsional vibrations that are created during engine operation. Specifically, referring to FIG. 1, the biasing members 28 can be urged inwardly in the direction R-R to attenuate torsional vibrations created by rotation of the first plate 12.

Turning to FIG. 2A, the torsion vibration damper assembly 26 has a biasing member retainer plate 30 that is used for securing the biasing members 28 in place. The retainer plate 30 is located at a first end 50 of the torsion vibration damper assembly 26. Referring to FIG. 1, the retainer plate 30 includes a series of recesses or damper pockets 54 circumferentially located and contoured to retain one of the biasing members 28. Each of the end sections 56 of the biasing member 28 are seated against the edges 58 of the damper pocket 54, where the end sections 56 of the biasing member 28 react against the edges 58 of the damper pocket 54 to attenuate torsional vibrations created by vibration of the first plate 12.

In the embodiment as illustrated in FIG. 2A, the first end 50 of the torsion vibration damper assembly 26 is connected to the first plate 12 by a fastener 60 connecting the biasing member retainer plate 30 with the first plate 12. A second end 52 of the torsion vibration damper assembly 26 is connected to the second plate 20, where a portion 62 of the second plate 20 curves inwardly towards and connects to a portion of the biasing member 28, thereby creating a connection between the torsion vibration damper assembly 26 and the second plate 20. The second rotating plate 20 is part of a housing for the torque transmitting device 24. The fastener 60 is any fastening device that secures the retainer plates 30 to either the first plate 12 or the second plate 20, such as, for example, a bolt or a screw. Although FIG. 2A illustrates the fastener 60, those skilled in the art will appreciate that other types of fastening approaches may be used instead for the retainer plate 30 such as, for example, a splined engagement.

Figure 2B:
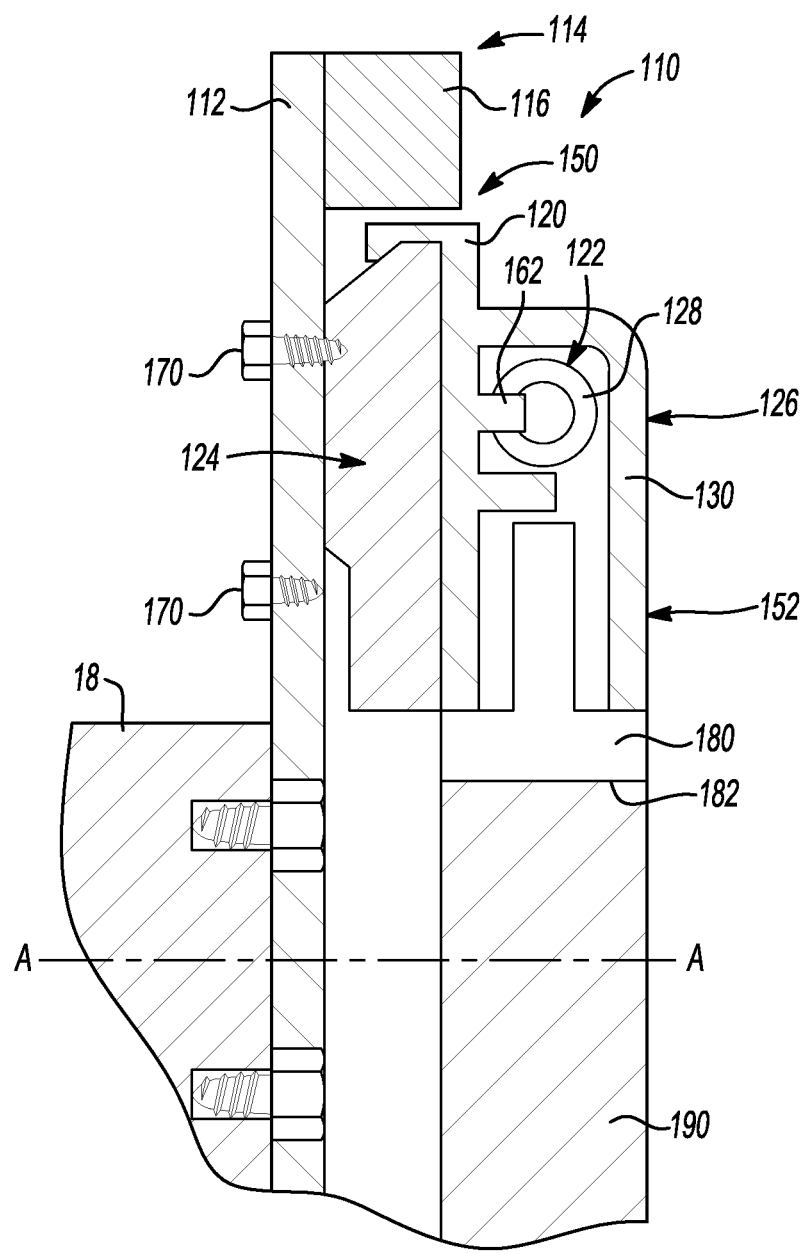
FIG. 2B is a cross sectioned view of an alternative embodiment of a vibration absorber system including a first set of vibration absorbers and a second set of vibration absorbers.

FIG. 2B is an alternative embodiment of a vibration absorber system 110 including a first rotating plate 112 and a first set of vibration absorbers 114 that each include a selectively moveable pendulum mass 116. The vibration absorber system 110 also includes a second plate 120 that is part of a torque transmitting device 124 such as, for example, a torque converter housing for an automatic transmission, or a clutch housing for a manual transmission. The second plate 120 of the torque transmitting device 124 is connected to a torsion vibration damper assembly 126 that secures and retains a second set of vibration absorbers 122 that are biasing members 128.

The first plate 112 is driven by an output shaft 118 that is a crankshaft of the engine, where the first plate 112 is connected to the second plate 120. In the embodiment as illustrated, a plurality of fasteners 170 connect the first plate 112 to the second plate 120, however those skilled in the art will appreciate that other fastening approaches, such as a splined engagement, may be used as well. The second plate 120 is part of a first end 150 of the torsion vibration damper assembly 126, and a retainer plate 130 is located at a second opposing end 152 of the torsion vibration damper assembly 126. A portion 162 of the second plate 120 curves inwardly to connect to the biasing member 128 and creates a connection between the torsion vibration absorber assembly 126 and the torque transmitting device 124. The torsion vibration absorber assembly 126 also secures a generally cylindrical hub 180 that is oriented along the axis A-A and includes an inner surface 182 that is configured for receiving an input shaft 190 of a transmission (not shown). In one embodiment, the inner surface 182 includes a plurality of splines that are configured to receive and secure the input shaft 190 in place within the hub 180.

Figure 3A:
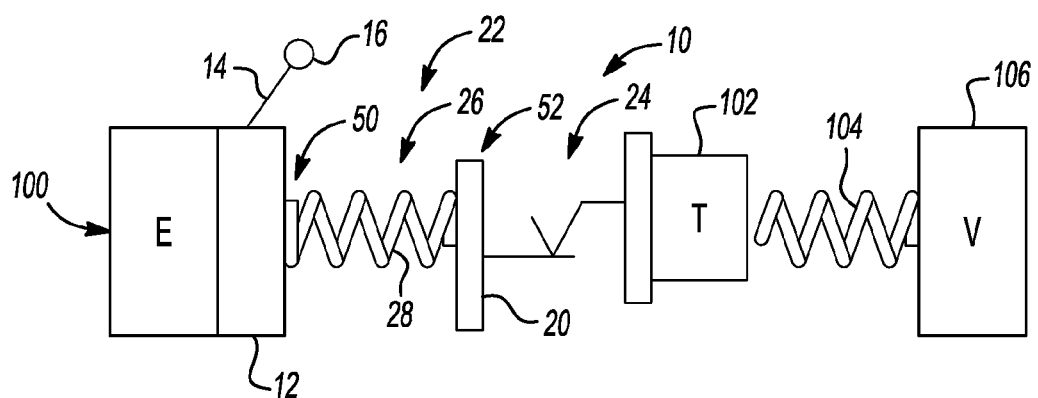
FIG. 3A is a schematic illustration of the vibration absorber system illustrated in FIG. 2A.
Figure 3B:
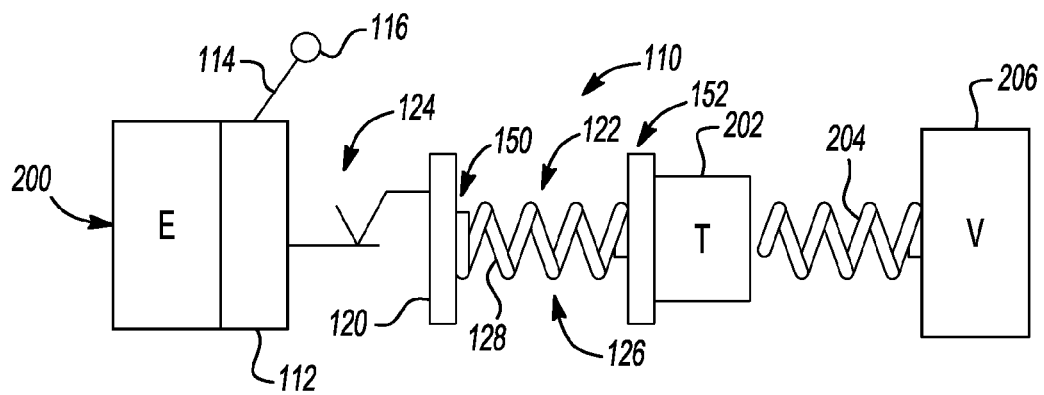
FIG. 3B is a schematic illustration of the vibration absorber system illustrated in FIG. 2B.

FIGS. 3A-3B are schematic illustrations of the embodiments illustrated in FIGS. 2A-2B of the vibration absorber system 10 and 110. Turning to FIG. 3A, an engine 100 is connected to the first plate 12, where the first plate 12 is a plate that mounts to an output shaft 18 (FIG. 2A) of the engine 100. The first set of vibration absorbers 14 are slidingly connected with the first plate 12, where each of the first vibration absorbers 14 include a selectively moveable pendulum mass 16. The torsion vibration damper assembly 26 is connected at the first end 50 to the first plate 12. The second end 52 of the torsion vibration damper assembly 26 is connected to the second plate 20, where the second rotating plate 20 is part of a housing for the torque transmitting device 24. The second set of vibration absorbers 22 that include the biasing member 28 connect the first plate 12 to the second plate 20. The torque transmitting device 24 is connected to an input shaft of the transmission 102. The transmission 102 is connected to an axle 104 of a vehicle 106.

Turning to FIG. 3B, an engine 200 is connected to the first plate 112. The first set of vibration absorbers 114 are slidingly connected with the first plate 112, where each of the first vibration absorbers 114 include a selectively moveable pendulum mass 116. The torque transmitting device 124 is connected to the first plate 112. The torque transmitting device 124 includes the second plate 120, where the second plate 120 is part of the first end 150 of the torsion vibration damper assembly 126. The second set of vibration absorbers 122 that include the biasing member 128 connect the second plate 120 to the retainer plate 130 located at the second opposing end 152 of the torsion vibration damper assembly 126. The torsion vibration absorber 126 receives the input shaft 190 (FIG. 2B) of a transmission 202. The transmission 202 is connected to an axle 204 of a vehicle 206.

Figure 4A:
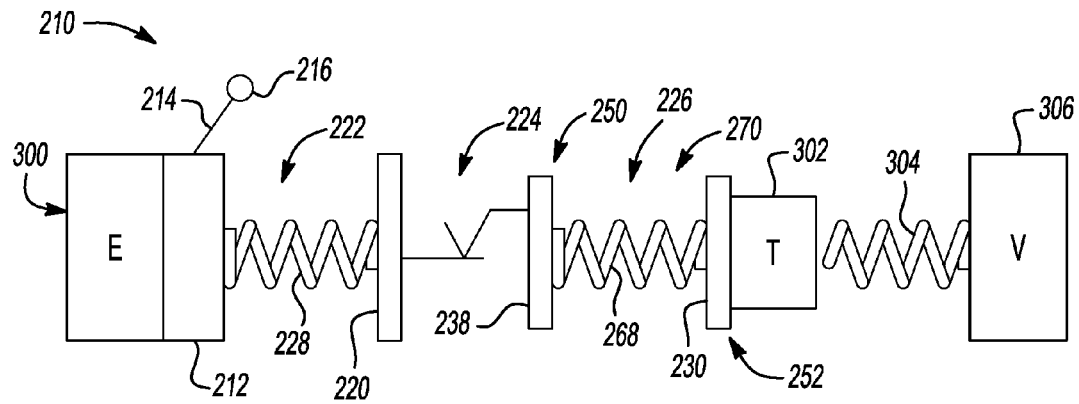
FIG. 4A is a schematic illustration of an alternative embodiment of a vibration absorber system.
Figure 4B:
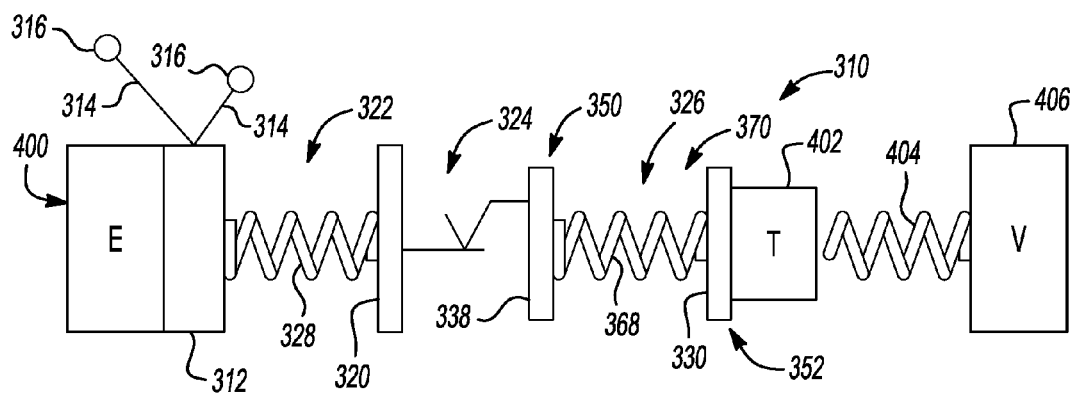
FIG. 4B is a schematic illustration of another embodiment of a vibration absorber system.

FIGS. 4A-4B are schematic illustrations of alternative embodiments of a vibration absorber system 210 and 310 that include a third set of vibration absorbers. Turning to FIG. 4A, an engine 300 is connected to a first plate 212, where the first plate 212 mounts to an output shaft (not shown) of the engine 300. A first set of vibration absorbers 214 are slidingly connected with the first plate 212, where each of the first vibration absorbers 214 include a selectively moveable pendulum mass 216. A second set of vibration absorbers 222 include a first biasing member 228 that connects the first plate 212 to a second plate 220. In one embodiment, the first biasing member 228 is a generally straight coil spring, however in another embodiment the spring may be arcuate as well. The second plate 220 is an inertial disk that is connected to a torque transmitting device 224. The torque transmitting device 224 includes a housing that includes a third plate 238. The third plate 238 is part of a first end 250 of a torsion vibration damper assembly 226 that is a third vibration absorber 270.

The torsion vibration damper assembly 226 includes a second biasing member 268 and a biasing member retainer plate 230. The retainer plate 230 is located at a second end 252 of the torsion vibration damper assembly 226. The torsion vibration absorber 226 is connected to a transmission 302, where in one embodiment the torsion vibration absorber 226 includes a hub (not shown) for receiving an input shaft of the transmission 302. However, it is understood that other approaches may be used as well to connect the torsion vibration absorber 226 to the transmission 302. The transmission 302 is connected to an axle 304 of a vehicle 306.

FIG. 4B is an alternative embodiment of the vibration absorber system 210 illustrated in FIG. 4A. The vibration absorber system 310 is similar to the vibration absorber 210, except that there are a plurality of first vibration absorbers 314 that are configured to absorb torsional vibrations that have at least two different harmonic orders. Specifically, the vibration absorber system 310 includes an engine 400 is connected to a first plate 312, where the first plate 312 mounts to an output shaft (not shown) of the engine 400. The first set of vibration absorbers 314 are slidingly connected with the first plate 312, where each of the first vibration absorbers 314 include a selectively moveable pendulum mass 316. At least one of the masses 316 travel at a different frequency when compared to the remaining masses 316. That is, each of the masses 316 do not travel in synchronicity with one another.

The vibration absorber system 310 further includes a second vibration absorber 322 including a first biasing member 328 that connects the first plate 312 to a second plate 320. The second plate 320 is an inertial disk that is connected to a torque transmitting device 324. The torque transmitting device 324 includes a housing that includes a third plate 338. The third plate 338 is part of a first end 350 of a torsion vibration damper assembly 326 that is a third vibration absorber 370. The torsion vibration damper assembly 326 includes a second biasing member 368 and a biasing member retainer plate 330. The retainer plate 330 is located at a second end 352 of the torsion vibration damper assembly 326. The torsion vibration absorber 326 is connected to a transmission 402. The transmission 402 is connected to an axle 404 of a vehicle 406. It should be noted that although FIGS. 4A-4B illustrate torque transmitting devices 224 and 324, in an alternative embodiment the torque transmitting devices 224 and 324 may be omitted from the vibration absorber systems 210 and 310.

Figure 5A:
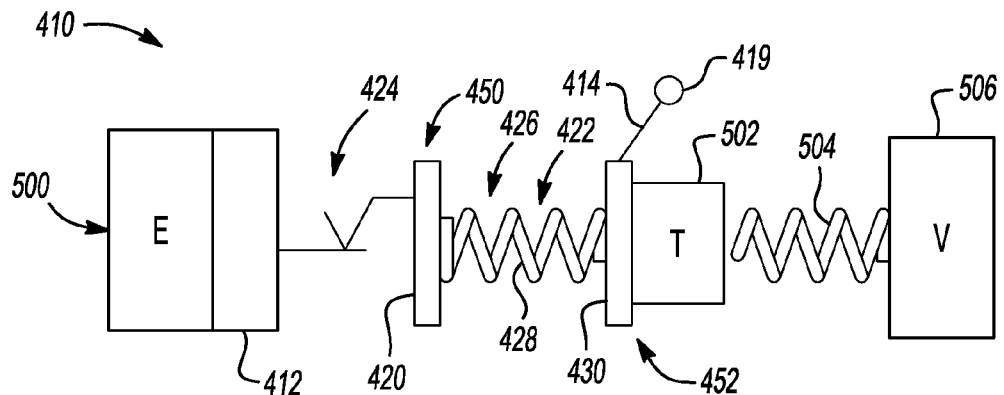
FIG. 5A is a schematic illustration of yet another embodiment of a vibration absorber system.

In the embodiments illustrated in FIGS. 1-4B, the first set of vibration absorbers 14, 114, 214, 314 are slidingly connected with the first plate 12, 112, 212, 312. However, the first set of vibration absorbers can also be engaged with other components of a vehicle as well, which is illustrated as vibration absorbers 410, 510, 610 and 710 in FIGS. 5A-6B. Turning now to FIG. 5A, an engine 500 is connected to a first plate 412, where the first plate 412 mounts to an output shaft (not shown) of the engine 500. A torque transmitting device 424 is connected to the first plate 412. The torque transmitting device 424 includes a second plate 420, where the second plate 420 is part of a first end 450 of a torsion vibration damper assembly 426 that is a second vibration absorber 422. The torsion vibration absorber 426 includes a second end 452 that is connected to a transmission 502.

The torsion vibration damper assembly 426 includes a biasing member 428 and a biasing member retainer plate 430. The retainer plate 430 is located at the second end 452 of the torsion vibration damper assembly 426. In one embodiment, an input shaft of the transmission 502 is received by a hub of the torsion vibration damper assembly 426, however it is understood that the transmission 502 may be connected to the torsion vibration damper assembly 426 using other approaches as well. A first set of vibration absorbers 414 are slidingly connected with an input shaft of the transmission 502, where each of the first vibration absorbers 414 include a selectively moveable pendulum mass 416. The transmission 502 is connected to an axle 504 of a vehicle 506.

Figure 5B:
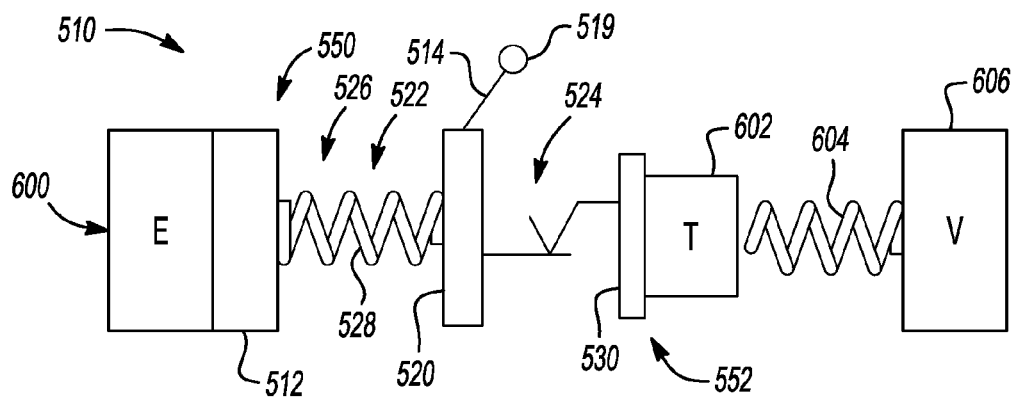
FIG. 5B is a schematic illustration of an embodiment of a vibration absorber system.

Turning now to FIG. 5B, an engine 600 is connected to the first plate 512, where the first plate 512 mounts to an output shaft of the engine 600. The first plate 512 is a first mass that is part of a torsion vibration absorber illustrated as a dual mass flywheel 526. The dual mass flywheel 526 is a second mass that is a second plate 520. A first set of vibration absorbers 514 are slidingly connected with the second plate 520, where each of the first vibration absorbers 514 include a selectively moveable pendulum mass 516. The second plate 520 is elastically coupled to the first plate 512 by a second set of vibration absorbers 522. In the embodiment as illustrated, the second set of vibration absorbers 522 are a plurality of biasing members 528. The dual mass flywheel 526 is connected at a first end 550 to a crankshaft of the engine 600 by the first plate 512. A second end 552 of the dual mass flywheel 526 is the second plate 520, where the second rotating plate 520 connects to a torque transmitting device 524. The torque transmitting device 524 is connected to an input shaft of a transmission 602. The transmission 602 is connected to an axle 604 of a vehicle 606.

Figure 6A:
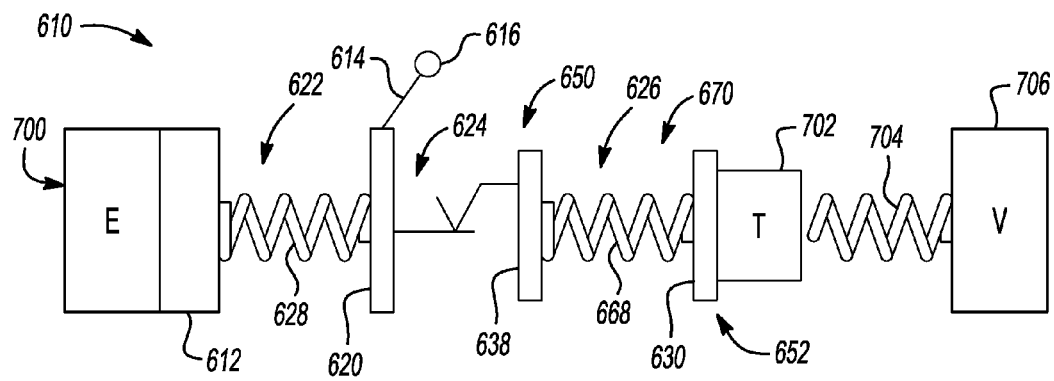
FIG. 6A is a schematic illustration of another embodiment of a vibration absorber system.

Turning now to FIG. 6A, an engine 700 is connected to a vibration absorber 610 by a first plate 612, where the first plate 612 mounts to an output shaft (not shown) of the engine 700. A first biasing member 628 connects the first plate 612 to a second plate 620. In one embodiment, the first biasing member 628 is a generally straight coil spring, however in another embodiment the spring may be arcuate as well. The second plate 620 is an inertial disk that is connected to a torque transmitting device 624. A first set of vibration absorbers 614 are slidingly connected with the second plate 620, where each of the first vibration absorbers 614 include a selectively moveable pendulum mass 616. A second set of vibration absorbers 622 include the first biasing member 628. The torque transmitting device 624 includes a housing that includes a third plate 638. The third plate 638 is part of a first end 650 of a torsion vibration damper assembly 626 that is a third vibration absorber 670.

The torsion vibration damper assembly 626 includes a second biasing member 668 and a biasing member retainer plate 630. The retainer plate 630 is located at a second end 652 of the torsion vibration damper assembly 626. The torsion vibration absorber 626 is connected to a transmission 702, where in one embodiment the torsion vibration absorber 626 includes a hub (not shown) for receiving an input shaft of the transmission 702. However, it is understood that other fastening approaches may be used as well to connect the torsion vibration absorber 626 to the transmission 702. The transmission 702 is connected to an axle 704 of a vehicle 706.

Figure 6B:
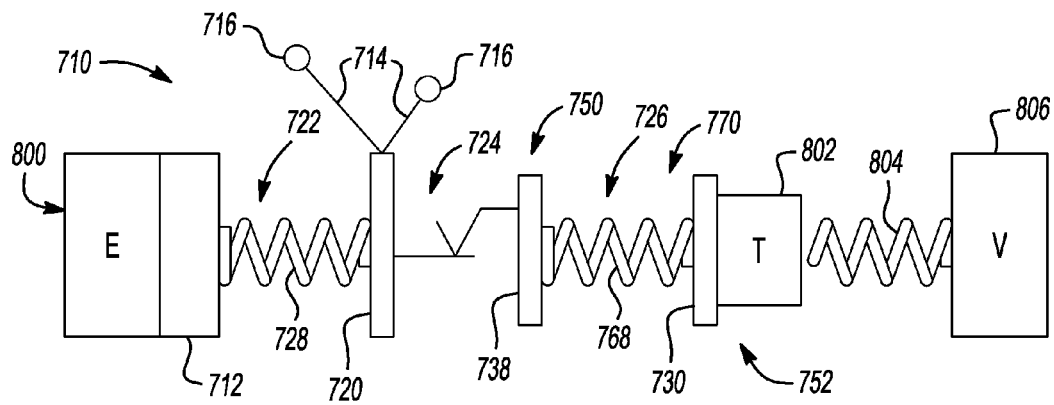
FIG. 6B is a schematic illustration of yet another embodiment of a vibration absorber system.

FIG. 6B is an alternative embodiment of the vibration absorber system 710 illustrated in FIG. 6A. The vibration absorber system 710 is similar to the vibration absorber 710, except that there are a plurality of first vibration absorbers 714 that are configured to absorb torsional vibrations that have at least two different harmonic orders. Specifically, the vibration absorber system 710 includes an engine 800 is connected to a first plate 712 mounts to an output shaft (not shown) of the engine 800. The second plate 720 is an inertial disk that is connected to a torque transmitting device 724. The first set of vibration absorbers 714 are slidingly connected with the second plate 720, where each of the first vibration absorbers 714 include a selectively moveable pendulum mass 716. At least one of the masses 716 travel at a different frequency when compared to the remaining masses 716. That is, each of the masses 716 do not travel in synchronicity with one another. A second set of vibration absorbers 722 that include a first biasing member 728 connects the first plate 712 to a second plate 720.

The torque transmitting device 724 includes a housing that includes a third plate 738. The third plate 738 is part of a first end 750 of a torsion vibration damper assembly 726. The torsion vibration damper assembly 726 is a third vibration absorber 770 includes a second biasing member 768 and a biasing member retainer plate 730. The retainer plate 730 is located at a second end 752 of the torsion vibration damper assembly 726. The torsion vibration absorber 726 is connected to a transmission 802. The transmission 802 is connected to an axle 804 of a vehicle 806.

Referring to FIGS. 1-6B, the first set of vibration absorbers 14, 114, 214, 314, 414, 514, 614, and 714 each have masses 16, 116, 216, 316, 416, 516, 616, and 716 that counteract at least some of the torque fluctuations created as the engine operates, especially at lower engine speeds that occur during idling. The second vibration absorbers that include the biasing member 28, 128, 228, 328, 428, 528 628 and 728 are employed to attenuate torsional vibrations that occur above the idling speed of the engine.

At least some types of torsional vibration absorbers are generally only effective to attenuate torsional vibrations that occur either at lower engine speeds, such as idle speed, or at higher engine speeds above idle. In contrast, the vibration absorber system 10, 110, 210, 310, 410, 510, 610, and 710 employs the first set of vibration absorbers configured to attenuate torsional vibrations at the first harmonic of the engine firing frequency. The second set of vibration absorbers are configured to attenuate torsional vibrations that are created at multiple harmonics of the engine. Moreover, in at least some embodiments, the vibration absorber system may further include a third vibration absorber as well. As a result, the vibration absorber system attenuates torsional vibration created at all engine speeds, unlike some of the conventional torsional vibration absorbers that are currently available.

The description of the invention is merely exemplary in nature and variations that do not depart from the gist of the invention are intended to be within the scope of the invention. Such variations are not to be regarded as a departure from the spirit and scope of the invention.

What is claimed is:

1. An apparatus for absorbing vibration and transmitting a torque between an output of an engine and an input of a transmission of a vehicle, the apparatus comprising:
a first member interconnected with the output of the engine and including at least one retaining member and at least one alternate retaining member;
a first vibration absorber including at least one mass and at least one alternate mass, the mass supported by the retaining member of the first member and the alternate mass supported by the alternate retaining member of the first member, wherein the mass has a predefined movement path with respect to the first member when the first member is rotating and the alternate mass has a predefined alternate movement path with respect to the first member when the first member is rotating, wherein the mass absorbs a portion of the vibrations through the first member from the engine to the transmission at a first range of engine speeds the alternate mass absorbs a portion of the vibrations through the first member from the engine to the transmission as the alternate mass moves along the alternate movement path at a third range of engine speeds; and
a second vibration absorber including at least one biasing member having a first end interconnected with the first member and a second end interconnected with the input of the transmission, wherein the biasing member is selected to absorb a portion of the vibrations through the second vibration absorber from the engine to the transmission at a second range of engine speeds, and wherein the speeds of the second range are lower than the speeds of the first range of engine speeds and the third range of engine speeds are greater than engine speeds of the first range of engine speeds.

2. The apparatus of claim 1 wherein the biasing member is a coil spring.

3. The apparatus of claim 1 wherein the first member is a flywheel.

4. The apparatus of claim 1 wherein the first vibration absorber is a centrifugal pendulum vibration absorber and the at least one mass defines an aperture having an aperture surface engaged with the retaining member of the first member, and wherein a profile of the aperture surface defines the movement path of the mass.

5. The apparatus of claim 1 further including a torque transmitting device having an input interconnected with the first member and an output interconnected with the input of the transmission, wherein the torque transmitting device is one of a clutch and a torque converter.

6. The apparatus of claim 5 wherein the first end of the biasing member is directly connected to the first member, the input of the torque transmitting device is directly connected to the second end of the biasing member, and the output of the torque transmitting device is directly connected to the input of the transmission.

7. The apparatus of claim 5 wherein the input of the torque transmitting device is directly connected to the first member, the output of the torque transmitting device is directly connected to the first end of the biasing member, and the second end of the biasing member is directly connected to the input of the transmission.

8. The apparatus of claim 5 further including a third vibration absorber including at least one alternate biasing member having a first end directly connected to the output of the torque transmitting device and a second end directly connected to the input of the transmission, wherein the first end of the biasing member of the second vibration absorber is directly connected to the first member and the second end of the biasing member of the second vibration absorber is directly connected to the input of the torque transmitting device.

9. The apparatus of claim 5 further including a third vibration absorber including at least one alternate biasing member having a first end directly connected to the output of the engine and a second end directly connected to the first member, wherein the input of the torque transmitting device is directly connected to the first member, the output of the torque transmitting device is directly connected to the first end of the biasing member of the second vibration absorber, and the second end of the biasing member of the second vibration absorber is directly connected to the input of the transmission.

* * * * *